Figure 1:
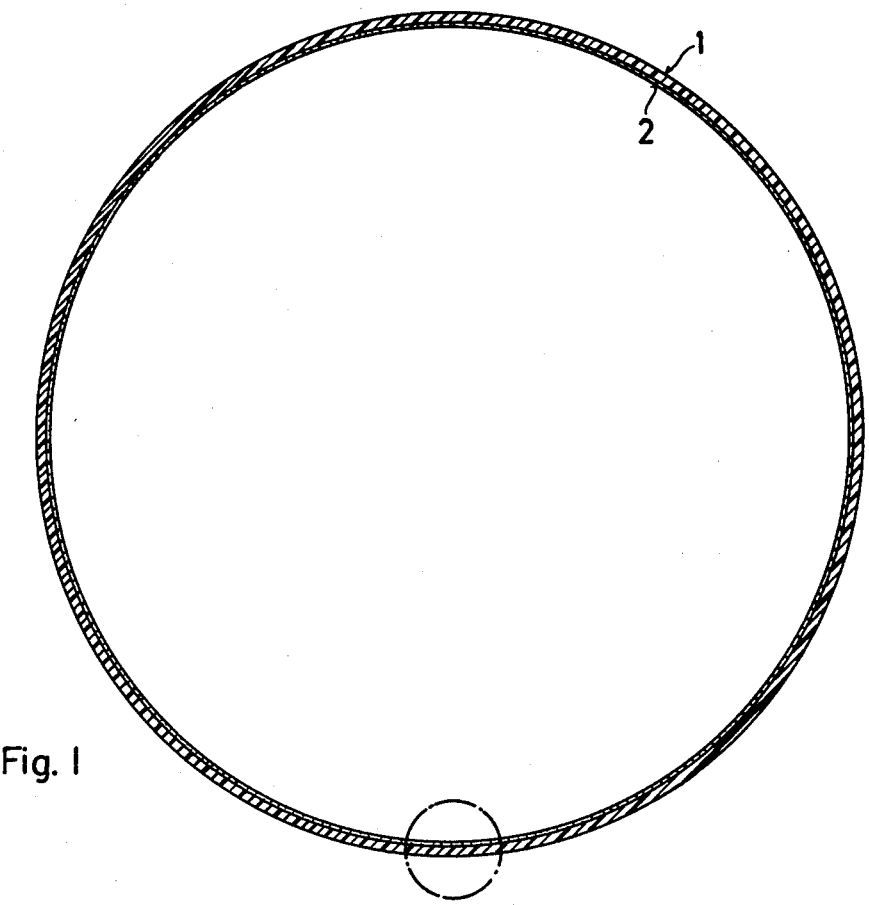
Figure 2:
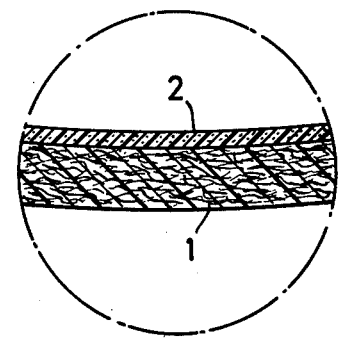

United States Patent [19]

Hammer et al.

[11] 4,097,623

[45] Jun. 27, 1978

[54] SHAPED ARTICLE OF CELLULOSE HYDRATE WITH A COATING OF PLASTIC MATERIAL OF CHEMICALLY MODIFIED PROTEIN AND PROCESS FOR THE PRODUCTION THEREOF

[75] Inventors: Klaus-Dieter Hammer, Mainz; Wolfgang Klendauer; Martin Schröder, both of Wiesbaden, all of Germany

[73] Assignee: Hoechst Aktiengesellschaft, Germany

[21] Appl. No.: 619,225

[22] Filed: Oct. 3, 1975

[30] Foreign Application Priority Data

Oct. 7, 1974 Germany .............................. 2447757

[51] Int. Cl.² ........................ B05D 7/02; B05D 7/22; A22C 13/00

[52] U.S. Cl. ................................ 427/230; 427/394; 427/399; 106/136; 106/124; 106/154 R; 260/119; 260/112 R; 260/123; 428/36; 428/464; 138/118.1; 426/105

[58] Field of Search ...................... 427/230, 394, 399; 138/118.1; 428/36, 464; 106/124, 125, 135, 136, 138, 147–149, 154; 260/8, 112 R, 117, 121, 123, 561 N

[56] References Cited

U.S. PATENT DOCUMENTS

| | | | |
|---|---|---|---|
| 1,478,968 | 12/1923 | Lenz et al. | 138/118.1 |
| 2,045,349 | 6/1936 | Goodman | 428/36 |
| 2,230,697 | 2/1941 | Prytikin | 428/36 |
| 2,375,103 | 5/1945 | Harrison | 106/149 |
| 3,533,808 | 10/1970 | Cameron | 138/118.1 |
| 3,539,361 | 11/1970 | Coleman | 428/36 |
| 3,582,364 | 6/1971 | Rose et al. | 138/118.1 |
| 3,749,573 | 7/1973 | Froehlich | 260/117 |
| 4,002,485 | 1/1977 | Hammer et al. | 260/112 R |

*Primary Examiner*—Ronald H. Smith
*Assistant Examiner*—Sam Silverberg
*Attorney, Agent, or Firm*—James E. Bryan

[57] ABSTRACT

This invention relates to a process for coating the surface of a shaped article of cellulose hydrate with a layer of polymer material which comprises applying to the surface of a shaped article in the gel state and based on cellulose hydrate, a liquid layer of an aqueous solution of a chemically modified protein obtained by mixing an aqueous alkaline protein solution with an aqueous solution of N-methylol-acrylamide or N-methylol-methacrylamide or of the alkoxy derivatives thereof of aliphatic alcohols with 1 to 8 carbon atoms, particularly of organic, tetrafunctional, doubly unsaturated compounds of the general formula

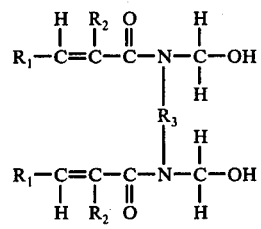

in which $R_1$ and $R_2$ are hydrogen or an alkyl group with 1 to 6 carbon atoms, and $R_3$ is the group $-(CH_2)_n-$, $n$ being an integer from 1 to 8, or the group

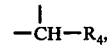

in which $R_4$ is an alkyl group with 1 to 18 carbon atoms, subjecting the liquid mixture to a dwell time, heating the coated shaped article, and wetting the shaped article. The invention also relates to a shaped article of cellulose hydrate having a coating of protein thereon.

24 Claims, 2 Drawing Figures

SHAPED ARTICLE OF CELLULOSE HYDRATE WITH A COATING OF PLASTIC MATERIAL OF CHEMICALLY MODIFIED PROTEIN AND PROCESS FOR THE PRODUCTION THEREOF

This invention relates to a shaped article based on cellulose hydrate and having, directly on its surface, a coating of plastic material of chemically modified protein. The invention particularly relates to a tube based on cellulose hydrate which has a coating of plastic material of chemically modified protein directly on its surface, particularly on its original inner side. The invention further relates to a tube of cellulose hydrate with a coating of plastic material of chemically modifed protein directly on the surface thereof, particularly on the original inner side of the tube, for use as a synthetic sausage casing.

The present invention further relates to a process for the production of a shaped article based on cellulose hydrate with a coating of plastic material of chemically modified protein directly on its surface.

The term "shaped article(s) based on cellulose hydrate" refers to shaped articles as supports for the coating which exclusively consist of cellulose hydrate as well as to those the larger quantitative portion of which is cellulose hydrate and the smaller quantitative portion of which is a chemical plasticizer, water or a mixture of both.

Cellulose hydrate tubes without internal impregnation are suitable only to a limited extent for use as synthetic sausage casings since the sausage meat, in the case of fresh sausages, adheres so firmly to the casing surface that the casing can be removed from the sausage meat only with difficulty and, in the case of long-keeping sausages, it adheres so loosely that the casing, upon drying of the sausage, separates from the sausage meat therein. The consequence is that the casing does not shrink together with the long-keeping sausage upon drying; the sausage thus develops folds and an unpleasant appearance.

Furthermore, at the places where the casing has separated from the sausage meat, mold growth often occurring renders the sausage meat completely inedible.

It is known to apply a layer of protein to the inner side of a cellulose hydrate tube to achieve good adhesion of the sausage meat to the casing, as well as a good peelability of the casing from the meat.

The known casings, however, do not meet the requirements because, due to the contact with the sausage meat, the protein separates from the tube surface either upon wetting of the tubular casing prior to filling or thereafter.

When conventional cross-linking agents, such as formaldehyde, urea, melamine-formaldehyde precondensates or similar chemical compounds, are added to the known treating solution, treatment is not satisfactory since those substances have different affinities for the surface of the casing of cellulose hydrate.

The low molecular weight cross-linking agents first diffuse preferably into the tubular casing and thus entail the risk that, by cross-linkage, the casing becomes brittle and that the protein deposited on the inner side of the tube is then not sufficiently cross-linked with the surface so that the above-mentioned disadvantages occur.

According to these known methods, uniform treatment of the cellulose hydrate surface is not satisfactory.

On the basis of the prior art, the present invention provides a shaped article based on regenerated cellulose, particularly a plasticizer-containing tube based on regenerated cellulose, which does not have the disadvantages of the known shaped articles and which has a firmly adhering coating of chemically modified protein directly on its surface, in the case of tubular shaped articles particularly on the original inner side. Another problem of the invention is to provide a process by which it is possible to produce shaped articles of the above-mentioned kind.

The present invention relates to a shaped article, preferably a tube, based on cellulose hydrate, preferably a plasticizer-containing shaped article based on cellulose hydrate, which has a firmly adhering coating of plastic material of chemically modified protein directly on its surface, in the case of a tube preferably on its original inner side. The invention also relates to the use of such a tube as a sausage casing.

The invention further relates to a process of the production of such shaped articles, particularly of such tubes, more particularly to internally coated tubes.

The problem of the invention is solved by a process for coating the surface of a shaped article, particularly of a tube, of cellulose hydrate with a layer of polymeric material, in which process protein solution is applied to the surface of a shaped article, particularly a tube, in the gel state and based on cellulose hydrate, the liquid portion of the solution is then removed and the coated shaped article, particularly the tube, is then wetted with water. In the process, to the surface of the shaped article, particularly of the tube, there is directly applied a liquid layer of an aqueous solution of a chemically modified protein obtained by mixing an aqueous alkaline protein solution with an aqueous solution of N-methylol-acrylamide or N-methylolmethacrylamide or of the alkoxy derivatives thereof of aliphatic alcohols with 1 to 8, perferably 1 to 2, carbon atoms, particularly of organic tetrafunctional, doubly unsaturated compounds of the general formula

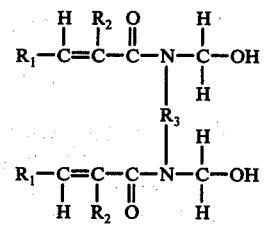

in which
$R_1$ and $R_2$ are hydrogen or an alkyl group with 1 to 6, preferably 1 to 3, carbon atoms, and
$R_3$ is the group $-(CH_2)_n-$, $n$ being an integer from 1 to 8, or the group

in which $R_4$ is an alkyl group with 1 to 18 carbon atoms, the liquid mixture is subjected to a dwell time, heat is then applied to the coated shaped article, particularly the tube, and the shaped article is then wetted.

The invention further relates to a shaped article, particularly to a tube, based on cellulose hydrate and having on its surface a coating of protein. The coating is directly on the surface of the shaped article, in the case of a tube particularly on the inner side, is firmly connected therewith, and is composed of chemically modified protein obtained by mixing an aqueous alkaline protein solution with an aqueous solution of N-methylol-acrylamide or N-methylol-methacrylamide or of the alkoxy derivatives thereof of aliphatic alcohols with 1 to 8, preferably 1 to 2, carbon atoms, particularly of organic tetrafunctional, doubly unsaturated compounds of the general formula

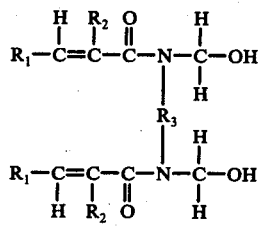

in which

R$_1$ and R$_2$ are hydrogen or an alkyl group with 1 to 6, preferably 1 to 3, carbon atoms, and R$_3$ is the group —(CH$_2$)$_n$—, n being an integer from 1 to 8, of the group

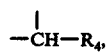

in which R$_4$ is an alkyl group with 1 to 18 carbon atoms, the liquid mixture being subjected to a dwell time.

The direct and firm connection of the coating to the surface of the shaped article of cellulose hydrate is substantially effected by the chemical reaction between OH groups of the cellulose hydrate forming the shaped article and N-methylol groups of the polyfunctional chemical compound with the splitting-off of H$_2$O.

The reaction leading to chemical conversion with the splitting-off of water between the above-mentioned groups and the stated reaction components is effected by the action of heat, preferably in the presence of chemical media which catalyze the reaction.

The characteristic feature that the coating directly adjoins the surface of the shaped article means, as regards its arrangement with respect to the support surface, that no additional chemical means influencing the adhesion of the two layers is between them. The liquid layer composed of an aqueous solution of the chemically modified protein is directly applied to the surface of a shaped article of cellulose hydrate in the gel state.

Within the scope of the present invention, an article in the gel state and based on cellulose hydrate refers to an article which has a water content of approximately 300 percent by weight, calculated on the total weight of the shaped article.

Within the scope of the present invention, the term "shaped article" refers to films and fibers, particularly, however, to tubes.

The coating of protein condensation product firmly adhering to the surface of the shaped article of cellulose hydrate has a thickness which corresponds to a weight per unit area in the range between 40 and 200 mg/m$^2$.

In the following, the term "protein" includes gelatin, zein collagen, and peanut protein, particularly, however, casein.

The plastic material of chemically modified protein is obtained by the addition of protein molecules to polyfunctional compounds based on acrylamide or methacrylamide, such as N-methylolacrylamide or N-methylol-methacrylamide as well as the alkoxy derivatives thereof of aliphatic alcohols with 1 to 8, preferably 1 to 2, carbon atoms, particularly organic tetrafunctional, doubly unsaturated compounds of the general formula

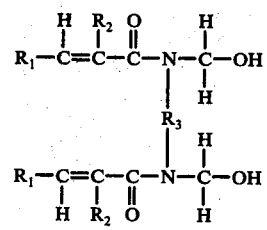

in which

R$_1$ and R$_2$ are hydrogen or an alkyl group with 1 to 6, preferably 1 to 3, carbon atoms, and R$_3$ is the group —(CH$_2$)$_n$—, n being an integer from 1 to 8, or the group

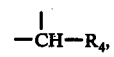

in which R$_4$ is an alkyl group with 1 to 18 carbon atoms, particularly preferably, however, N-methylol-N,N'-methylene-bisacrylamide or N-methylol-N,N'-methylene-bismethacrylamide.

It is assumed that the protein molecules are added to the organic, tetrafunctional, doubly unsaturated compounds.

The general term "polyfunctional, aliphatic, compound" is also used in the following for the above shown organic compounds having at least one reactive carbon double bond and at least one reactive N-methylol group in the molecule.

The aqueous solution containing chemically modified protein and used for the formation of the coating on the surface of the shaped article is prepared as follows:

Such a quantity of protein, e.g. casein, is dissolved in a corresponding quantity of water that an aqueous solution with a protein portion in the range from 9 to 15, preferably 10 to 12, percent by weight, calculated on the total weight of the aqueous solution, is obtained. The protein is caused to swell, 25 percent by weight ammonia solution being added in such a quantity that the solution has a pH value in the range from 8 to 14, preferably in the range from 10 to 12 (liquid A).

In another variation of the process, an alkaline, aqueous protein solution, preferably an alkaline, aqueous casein solution, is prepared in such a manner that it contains a protein portion in the range of 0.5 to 8 percent by weight, preferably in the range of 1 to 6 percent by weight (liquid B).

Furthermore, by dissolving a polyfunctional, aliphatic compound, e.g. N-methylol-N,N'-methylene-bisacrylamide or N-methylol-N,N'-methylene-bismethacrylamide, in water, a 1 to 30 percent by weight, preferably 3 to 10 percent by weight, aqueous solution, calculated on the total weight of the solution, is prepared (liquid C).

For the performance of the second process variation, such a quantity of polyfunctional, aliphatic compound, e.g. N-methylol-N,N'-methylene-bisacrylamide or N-methylol-N,N'-methylene-bismethacrylamide, is dissolved in water that the solution has a portion of 5 to 10 percent by weight, preferably a portion of 6 to 8 percent by weight, calculated on the total weight of the solution (liquid D).

According to the first variation, liquid A is mixed with liquid C with intense stirring in such a manner that the resulting liquid mixture has a portion of 5 to 10 percent by weight, preferably 6 to 8 percent by weight, of polyfunctional compound, preferably N-methylol-N,N'-methylene-bisacrylamide or N-methylol-N,N'-methylene-bismethacrylamide, calculated on the protein quantity, in the liquid mixture.

The liquid is then subjected to a dwell time in the range between 2 and 8 hours at room temperature. The liquid then has a viscosity from 80 to 250 falling-ball seconds (measuring temperature 25° C).

The viscosity is measured as follows:

A glass tube of a length of about 450 mm and an inside diameter of 25 mm has two marks at a distance of 150 mm from one another. One end of the tube is closed by means of a stopper. The solution to be measured is poured into the obliquely held tube until it is above the upper mark. The tube is then stored at 25° C until no air bubbles can be recognized in the filled-in solution. For measurement, a ball of a diameter of 2.5 mm and a weight of 64.5±0.9 mg is caused to fall into the upper opening of the vertical tube.

The falling time of the ball between the two marks is measured. The measure for the viscosity of the solution is the number of seconds which corresponds to the falling time of the ball between the two marks on the tube.

Preferable, however, is the second variation, which is based on the solutions B and D; the solutions are mixed with one another in such a manner that the liquid mixture has a portion from 5 to 10 percent by weight, preferably from 6 to 8 percent by weight, of polyfunctional, aliphatic compound, e.g. N-methylol-N,N'-methylene-bisacrylamide or N-methylol-N,N'-methylene-bismethacrylamide, calculated on the protein content of the liquid mixture.

After the stated dwell times, the reaction solutions obtained according to the mentioned variations can be directly used for coating the surface of the shaped article. To the liquid solution, there are preferably added chemical substances which can chemically catalyze the reaction of the N-methylol groups of the chemically modified protein with OH groups of the cellulose hydrate molecules of the support. The known cross-linking catalysts are suitable for this purpose, e.g. ammonium chloride, magnesium chloride, zinc chloride, zinc nitrate, and other similarly acting substances, which are present in the solution in a quantity from 5 to 80 g/l of the solution. The catalytic effect preferably proceeds in a pH range between 4 and 6, which is adjusted by careful acidification of the solution containing the chemically modified protein and chemical cross-linking agent by the addition of hydrochloric acid, acetic acid or formic acid, or similarly acting acids.

In known manner by means of conventional device, the aqueous solution containing the reactive, chemically modified portein and the polyfunctional, aliphatic, chemical compound is then directly applied to the surface of the cellulose hydrate article in the gel state. This is illustrated by the example of tube coating.

Processes for the production of tubes of cellulose hydrate as well as processes for their internal coating are known and are no part of the present invention. According to the known processes, a viscose solution of known composition is pressed in known manner through an annular slot die into a known acid precipitating liquid, e.g. an aqueous solution of sulfuric acid and sodium sulfate, the tube is then continuously passed through known regenerating liquids and the tube of cellulose hydrate is then washed with water and a plasticizer-containing liquid, e.g, and aqueous glycerol solution, is caused to act on the tube. The tube is then in the gel state. For internal impregnation of the tube, a liquid layer of a solution containing chemically modified protein is then applied to its original inner side. For this purpose, there is used, for example, a known device which is composed of two guide rollers, two squeeze roller pairs, a drying channel, and a wetting device. All rollers are so arranged that their axes are parallel to one another and parallel to the horizontal. The two squeeze roller pairs are so arranged with respect to one another that the longitudinal axes of their roller gaps are parallel to the horizontal. The arrangement of the individual elements of the device becomes clear by the following:

A plasticizer-containing tube piece in the gel state of a length of approximately 250 to 300 m is passed downwardly around the first guide roller and then again upwardly around the second guide roller the axis of which is in a plane beneath that of the first guide roller. The tube is then passed into the roller gap of the first squeeze roller pair. In the tube section between the first guide roller and the first squeeze roller pair, there is a quantity of coating liquid sufficient for internal coating of the above tube length. Prior to the beginning of the process, the required quantity of coating liquid is filled into the section of the tube.

The tube horizontally leaving the gap of the first squeeze roller pair is passed, without a change of direction, into the roller gap of the second squeeze roller pair and passed therethrough. In the zone between the first and the second squeeze roller pairs, the tube is inflated by supporting air. The supporting air is introduced into the tube section at the beginning of the process. In the direction of travel of the tube after the first squeeze roller pair, there is a drying channel through which the inflated tube is passed.

When the inflated tube has left the drying channel, it is passed through a wetting zone without a change of direction, within which zone water is sprayed on it by means of spraying nozzles. The drying channel as well as the spraying device are in the zone between the two squeeze roller pairs.

In the above-mentioned sequence, the entire tube of the stated length is continuously passed over the first and the second guide rollers, through the roller gap of the first squeeze roller pair, through a drying zone, then through a wetting zone, and then through the roller gap of the second squeeze roller pair, the inside of the tube being provided with a liquid coating of coating solution. In the heating zone, heat at a temperature in the range between 80° and 120° C is caused to act on the tube, which heat is sufficient to remove the water from the tube and to effect the chemical reaction between the reactive OH groups of the chemically modified protein and the OH groups of the cellulose hydrate forming the shaped article.

The stated temperatures do not apply only to the specific case of tube coating but apply in general within the scope of the present invention. By the action of heat, the tube is dried and the layer on the inside of the tube is converted into a firm coating.

The tube is passed through the heating zone (heating channel) at a speed of 2 to 25 m/min., preferably of 12 to 20 m/min. The tube is then wetted with water until it has a portion in the range between 8 and 12 percent by weight of water, calculated on the total weight of the tube. The tube is then wound up.

The coating directly on the surface of the shaped article is firmly connected therewith. It is assumed that the firm connection of the coating to the surface of the shaped article is based on covalent chemical bonds.

Only negligible portions of the coating can be removed from the coating by extraction. Therefore, the disadvantages do not occur which have to be encountered in the case of known internally coated tubes, particularly the different affinities of protein and cross-linking agent for the surface of the shaped article, which leads to a reduction of the treatment quality and permits the extraction of coating constituents.

The shaped article of the invention has a coating which is very uniform. Without a reduction of the desired effect of the coating, this uniformity permits the application of a relatively thin coating, compared to the thickness of known coatings.

Internally impregnated, plasticizer-containing tubes of cellulose hydrate produced according to the process of the invention are excellently suitable as casings for the production of boiled sausages and long-keeping sausages.

In the case of boiled sausages, such as finely minced pork sausages, the coating on the inside of the tube prevents separation of gelatin or fat and permits easy peeling of the tube from the sausage meat when the sausage is used according to its destination. In the case of long-keeping sausage, the coating provides good and uniform adhesion of the sausage meat to the casing during drying and smoking of the sausage so that separation of the casing from the sausage at certain places cannot occur since the sausage casing shrinks uniformly with the sausage meat. On the other hand, in the case of those sausages, the sausage casing can be easily removed from the sausage meat when the sausage is used according to its destination.

The accompanying drawing illustrates the structure of a tube based on cellulose hydrate which, on its inner side, has a coating of plastic material based on chemically modified protein. The drawing is a diagrammatic cross-section of the tube. Numeral 1 indicates the tubular casing of cellulose hydrate and numeral 2 the coating of plastic material of chemically modified protein, which directly adjoins the inside of casing 1.

The invention will be further illustrated by reference to the following specific examples:

EXAMPLE 1

80 g of casein, corresponding to 70.3 g of pure milk protein, (Rovita FN 4; Rovita GmbH, Aschau/Kraiburg, Germany) are uniformly distributed with stirring in 556 ml of water and swollen. 34 ml of concentrated $NH_4OH$ (25 percent) are then added. The casein solution has a pH value of 10. It is cooled with stirring to 20° C and mixed with 84 ml of a 4.3 percent (6 percent, calculated on milk protein) aqueous solution of N-methylol-N,N'-methylene-bisacrylamide. After uniform distribution, the viscosity increases considerably; the reaction product becomes gelatinous. Stirring is then interrupted at once (approximately 30 seconds after the addition) and the mixture is left standing for 4 to 8 hours at room temperature, the viscosity gradually decreasing to about 200 falling-ball seconds. The solution is then diluted with water to a casein content of 3 percent and mixed with 40 g/l of $NH_4Cl$ as well as 10 percent of glycerol. 2 l of this solution are filled into a cellulose hydrate tube of an internal diameter of 40 mm which has a fibrous paper insert so that they are in a tube section between two squeeze rollers and one guide roll in front of the dryer inlet. At a speed of 19 m/min., the tube is then passed in the inflated state through a horizontal dryer of a length of 50 m, the drying temperature being between 90° and 120° C.

When the tube has left the dryer it is sprayed with water and wetted to 8 to 10 percent by weight. The quantity of coating is 80 to 100 $mg/m^2$. The tubes can be easily filled with sausage meat. They adhere so firmly to the sausage meat that they shrink together with the meat without being separated. When they are consumed they can be easily peeled off.

EXAMPLE 2

80 g of casein, corresponding to 70.3 g of pure milk protein, (Rovita FN 4; Rovita GmbH, Aschau/Kraiburg, Germany) are distributed in 1,208 ml of water, swollen, and dissolved by the addition of 34 ml of concentrated $NH_4OH$ (25 percent). 84 ml of a 4.3 percent (6 percent, calculated on milk protein) aqueous solution of N-methylol-N,N'-methylene-bisacrylamide are rapidly added to this solution. After a dwell time of 6 hours, the solution containing 5 percent of casein is mixed with 10 percent of glycerol and 50 g/l of $MgCl_2$ and used for treating a fibrous casing, as described in Example 1. The impregnated tube surface is uniformly colored violet with a neocarmine solution. The tubes can be easily filled, have a satisfactory adhesion to the sausage meat during drying, smoking, and storing, shrink with the meat and can be easily peeled for consumption. The quantity of coating is 100 $mg/m^2$.

EXAMPLE 3

80 g of casein, corresponding to 70.3 g of pure milk protein, (Rovita FN 4; Rovita GmbH., Aschau/Kraiburg, Germany) are uniformly distributed in 2,102 ml of water, well swollen, and dissolved by the addition of 34 ml of concentrated $NH_4OH$ (25 percent). 84 ml of a 4.3 percent (6 percent, calculated on milk protein) aqueous solution of N-methylol-N,N'-methylene-bisacrylamide are rapidly and uniformly stirred into this solution. This solution contains 3 percent of casein. After a dwell time of the liquid mixture of 2 hours, 30 g/l of $NH_4Cl$ and 10 percent of glycerol are added to this solution. A tube as described in Example 1 is treated with the liquid under the same conditions. The quantity of coating is 70 $mg/m^2$. The surface is uniformly colored violet with neocarmine solution. The tubes can be easily filled and have a good adhesion to the sausage meat during drying and storing and can be easily removed from the meat for consumption.

EXAMPLE 4

80 g of casein, corresponding to 70.3 of pure milk protein, (Rovita FN 4; Rovita GmbH, Aschau/K- raiburg, Germany) are uniformly distributed in 2,102 ml of water, well swollen, and dissolved by the addition of 34 ml of concentrated $NH_4OH$ (25 percent). 70 ml of a 5 percent by weight (5 percent, calculated on milk protein; 3.5 g) aqueous N-methylol-acrylamide solution are rapidly and uniformly stirred into this solution. This solution contains 3 percent of casein. After a dwell time of 150 minutes, 30 g/l of $NH_4Cl$ and 10 percent of glycerol are added to the liquid mixture. A fibrous tube as described in Example 1 is treated with the liquid under the conditions there stated. The quantity of coating is 70 mg/m². The surface is uniformly colored violet with neocarmine solution. The tubes can be easily filled and have a good adhesion to the sausage meat during drying an storing and can be easily removed from the meat when they are consumed.

EXAMPLE 5

The procedure is as in Example 1 but with the exception that the casein solution described in Example 1 is mixed with 84 ml of a 5 percent by weight (6 percent by weight of milk protein) aqueous solution of N-methylol-N,N'-methylene-bismethacrylamide. Further processing of the mixture prepared from the two solutions is the same as in Example 1.

It will be obvious to those skilled in the art that many modifications may be made within the scope of the present invention without departing from the spirit thereof, and the invention includes all such modifications.

What is claimed is:

1. A process for coating the surface of a shaped article of cellulose hydrate with a layer of polymer material which comprises applying to the surface of a shaped article in the gel state and based on cellulose hydrate, a liquid layer of an aqueous solution of a chemically modified protein obtained by mixing an aqueous alkaline protein solution with an aqueous solution of N-methylol-acrylamide or N-methylolmethacrylamide or of the alkoxy derivatives thereof of aliphatic alcohols with 1 to 8 carbon atoms, particularly of organic, tetrafunctional, doubly unsaturated compounds of the general formula

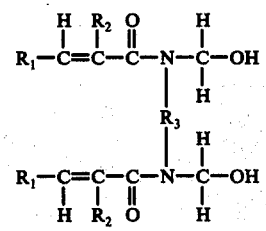

in which
$R_1$ and $R_2$ are hydrogen or an alkyl group with 1 to 6 carbon atoms, and
$R_3$ is the group —$(CH_2)_n$—, $n$ being an integer from 1 to 8, or the group

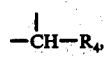

in which $R_4$ is an alkyl group with 1 to 18 carbon atoms,
subjecting the liquid mixture to a dwell time, heating the coated shaped article at a temperature in the range between 80° and 120° C, which heat is sufficient to remove the water from the shaped article and to effect the chemical reaction between the reactive OH groups of the chemically modified protein and the OH groups of the cellulose hydrate forming the shaped article, and wetting the shaped article with water until it has a portion in the range between 8 to 12% by weight of water calculated on the total weight of the shaped article.

2. A process according to claim 1 in which the polyfunctional chemical compound is N-methylol-acrylamide.

3. A process according to claim 1 in which the polyfunctional chemical compound is N-methylol-methacrylamide.

4. A process according to claim 1 in which the tetrafunctional, doubly unsaturated compound is N-methylol-N,N'-methylenebisacrylamide.

5. A process according to claim 1 in which the tetrafunctional, doubly unsaturated compound is N-methylol-N,N'-methylene-bismethacrylamide.

6. A process according to claim 1 in which the protein is casein.

7. A process for the production of a tube based on cellulose hydrate with a coating based on protein on the surface thereof, in which process the tubular body is produced from viscose solution by precipitation and a coating based on protein is applied to the inner side of the tube in the gel state, comprising applying to the inner side of the tube in the gel state, a liquid layer of an aqueous solution of a chemically modified protein obtained by mixing an aqueous alkaline protein solution with an aqueous solution of N-methylol-acrylamide or N-methylol-methacrylamide or of the alkoxy derivatives thereof of aliphatic alcohols with 1 to 8 carbon atoms, particularly of organic, tetrafunctional, doubly unsaturated compounds of the general formula

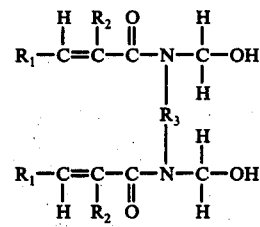

in which
$R_1$ and $R_2$ are hydrogen or an alkyl group with 1 to 6 carbon atoms, and
$R_3$ is the group —$(CH_2)_n$—, $n$ being an integer from 1 to 8, or the group

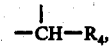

in which $R_4$ is an alkyl group with 1 to 18 carbon atoms,
subjecting the liquid mixture to a dwell time, heating the coated tube at a temperature in the range between 80° and 120° C, which heat is sufficient to remove the water from the tube and to effect the chemical reaction between the reactive OH-groups of the chemically modified protein and the OH-groups of the cellulose hydrate forming the tube, and wetting the coated tube with water until it has a portion in the range between 8 to 12% by weight of water, calculated on the total weight of the tube.

8. A process according to claim 7 in which the aliphatic, polyfunctional compound in the liquid layer is N-methylol-acrylamide.

9. A process according to claim 7 in which the aliphatic, polyfunctional compound in the liquid layer is N-methylol-methacrylamide.

10. A process according to claim 7 in which the tetrafunctional, doubly unsaturated compound in the liquid layer is N-methylol-N,N'-methylene-bisacrylamide.

11. A process according to claim 7 in which the tetrafunctional, doubly unsaturated compound in the liquid layer is N-methylol-N,N'-methylene-bismethacrylamide.

12. A process according to claim 7 in which the protein in the liquid layer is casein.

13. A process for coating the surface of a shaped article of cellulose hydrate in the gel state wtih a layer of polymer material which comprises mixing an alkaline aqueous protein solution with an aqueous solution which contains as the dissolved portion N-methylol-acrylamide or N-methylol-methacrylamide or the alkoxy derivatives thereof of aliphatic alcohols with 1 to 8 carbon atoms, particularly organic, tetrafunctional, doubly unsaturated compounds of the general formula

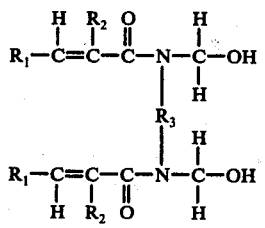

in which
R$_1$ and R$_2$ are hydrogen or an alkyl group with 1 to 6 carbon atoms,
R$_3$ is the group —(CH$_2$)$_n$—, $n$ being an integer from 1 to 8, or the group

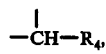

in which R$_4$ is an alkyl group with 1 to 18 carbon atoms,
subjecting the liquid mixture to a dwell time, applying the mixture to the surface of the shaped article, heating the shaped article at a temperature in the range between 80° and 120° C, which heat is sufficient to remove the water from the shaped article and to effect the chemical reaction between the reactive OH groups of the chemically modified protein and the OH groups of the cellulose hydrate forming the shaped article, drying the shaped article, and then wetting it with water until it has a portion in the range between 8 to 12% by weight of water calculated on the total weight of the shaped article.

14. A process according to claim 13 in which the polyfunctional compound is N-methylol-acrylamide.

15. A process according to claim 13 in which the polyfunctional compound is N-methylol-methacrylamide.

16. A process according to claim 13 in which the tetrafunctional, doubly unsaturated compound is N-methylol-N,N'-methylenebisacrylamide.

17. A process according to claim 13 in which the tetrafunctional, doubly unsaturated compound is N-methylol-N,N'-methylenebismethacrylamide.

18. A process according to claim 13 in which the protein is casein.

19. A process for the production of a tube based on cellulose hydrate with a coating based on protein on the surface thereof, in which process the tubular body is produced from viscose solution by precipitation and a coating based on protein is applied to the inner side of the tube in the gel state, which comprises mixing an alkaline aqueous protein solution with an aqueous solution which contains as the dissolved portion N-methylol-acrylamide or N-methylolmethacrylamide or the alkoxy derivatives thereof of aliphatic alcohols with 1 to 8 carbon atoms, particularly organic, tetrafunctional, doubly unsaturated compounds of the general formula

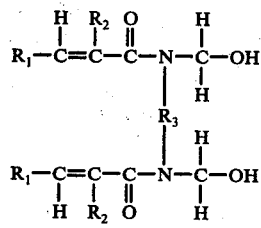

in which
R$_1$ and R$_2$ are hydrogen or an alkyl group with 1 to 6 carbon atoms, and
R$_3$ is the group —(CH$_2$)$_n$—, $n$ being an integer from 1 to 8, or the group

in which R$_4$ is an alkyl group with 1 to 18 carbon atoms,
subjecting the liquid mixture to a dwell time, applying the mixture to the original inner side of the cellulose hydrate tube in the gel state, heating the tube at a temperature in the range between 80° and 120° C, which heat is sufficient to remove the water from the tube and to effect the chemical reaction between the reactive OH groups of the chemically modified protein and the OH groups of the cellulose hydrate forming the tube, drying the tube, and then wetting it with water until it has a portion in the range between 8 to 12% by weight of water, calculated on the total weight of the tube.

20. A process according to claim 19 in which the polyfunctional compound is N-methylol-acrylamide.

21. A process according to claim 19 in which the polyfunctional compound is N-methylol-methacrylamide.

22. A process according to claim 19 in which the tetrafunctional, doubly unsaturated compound is N-methylol-N,N'-methylenebisacrylamide.

23. A process according to claim 19 in which the tetrafunctional, doubly unsaturated compound is N-methylol-N,N'-methylenebismethacrylamide.

24. A process according to claim 19 in which the protein is casein.

* * * * *